Figures 2, 3:
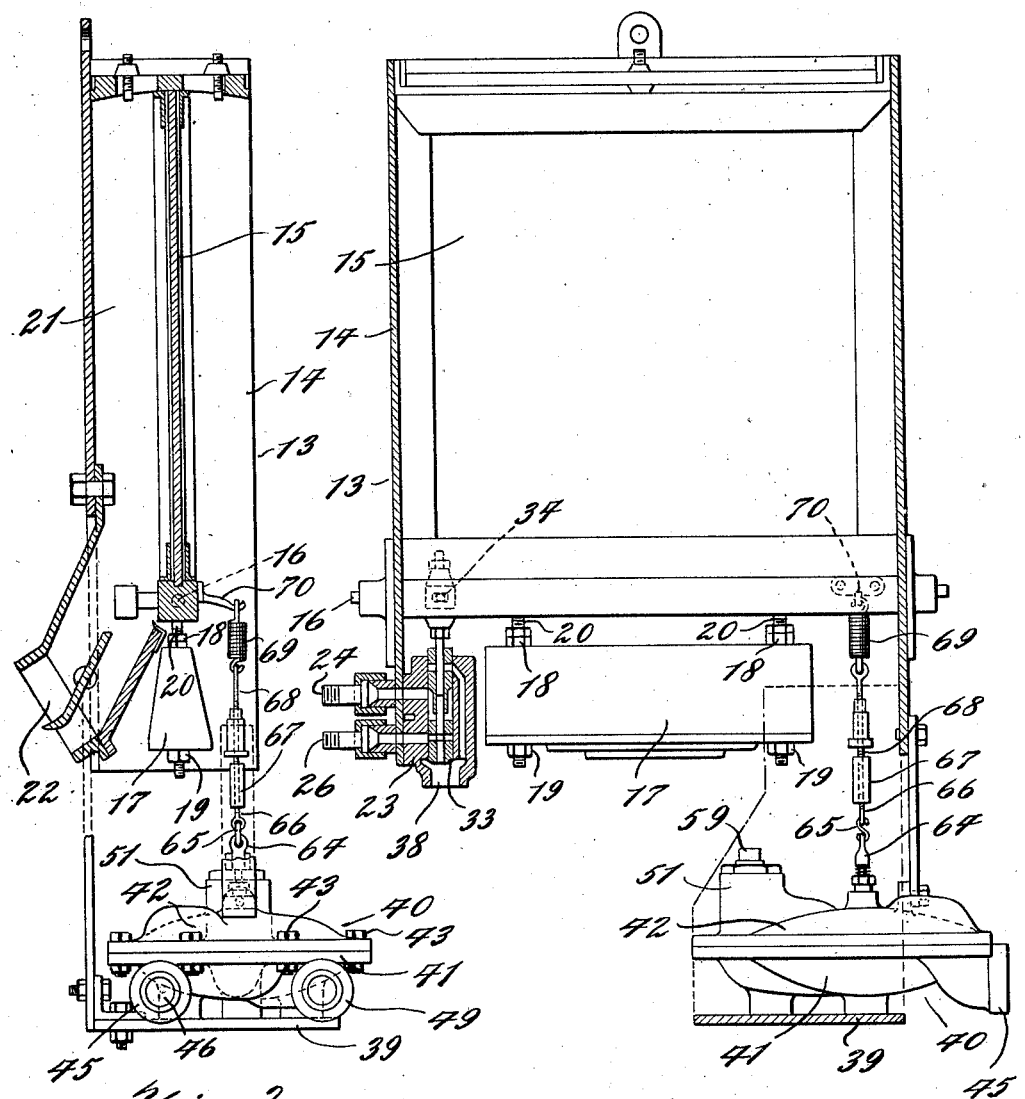

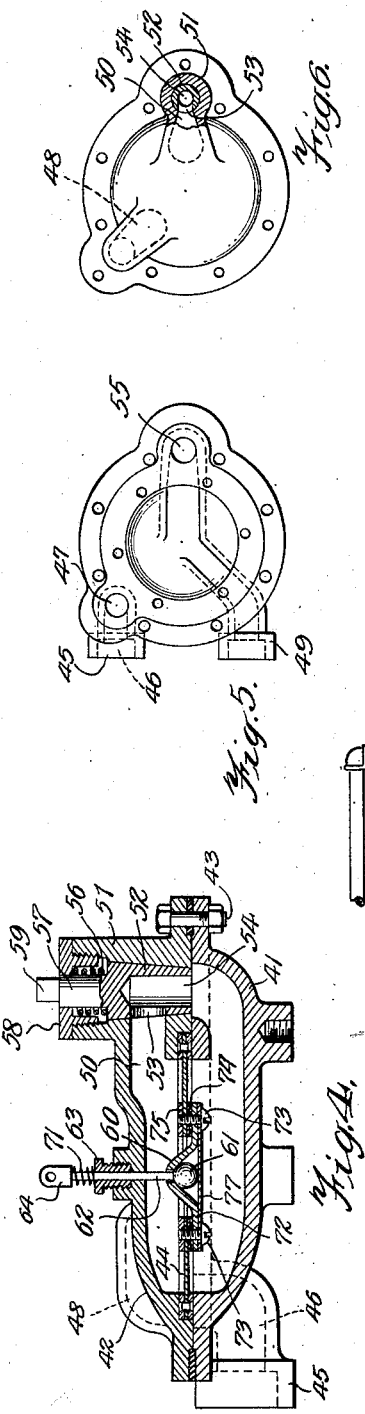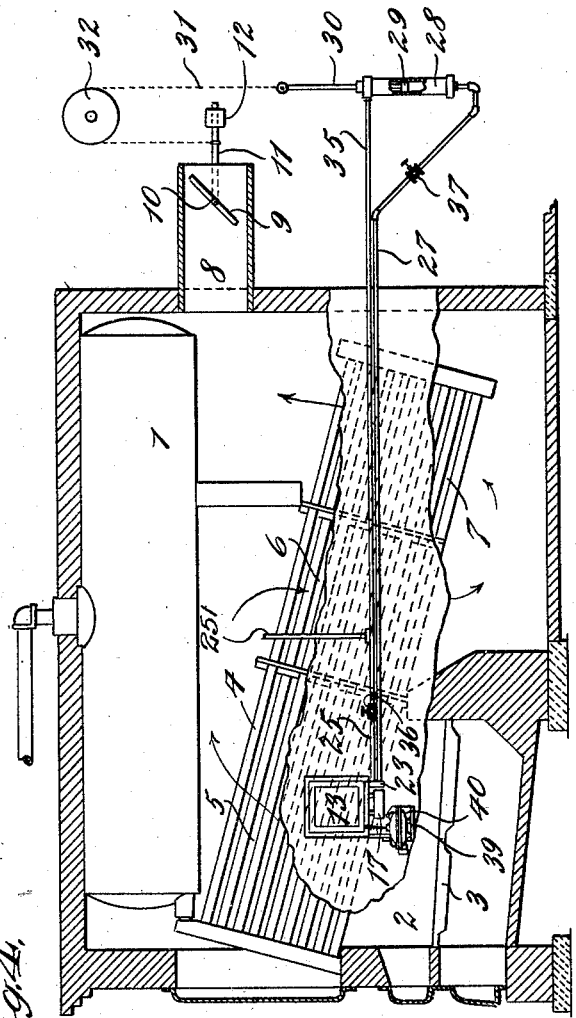

April 15, 1930. E. McLEAN 1,754,279
FURNACE AND CONTROL THEREFOR
Filed Aug. 4, 1923 3 Sheets-Sheet 2

INVENTOR.
Embury McLean
BY
Gifford, Bull & Heall
his ATTORNEYS

April 15, 1930.  E. McLEAN  1,754,279
FURNACE AND CONTROL THEREFOR
Filed Aug. 4, 1923  3 Sheets-Sheet 3
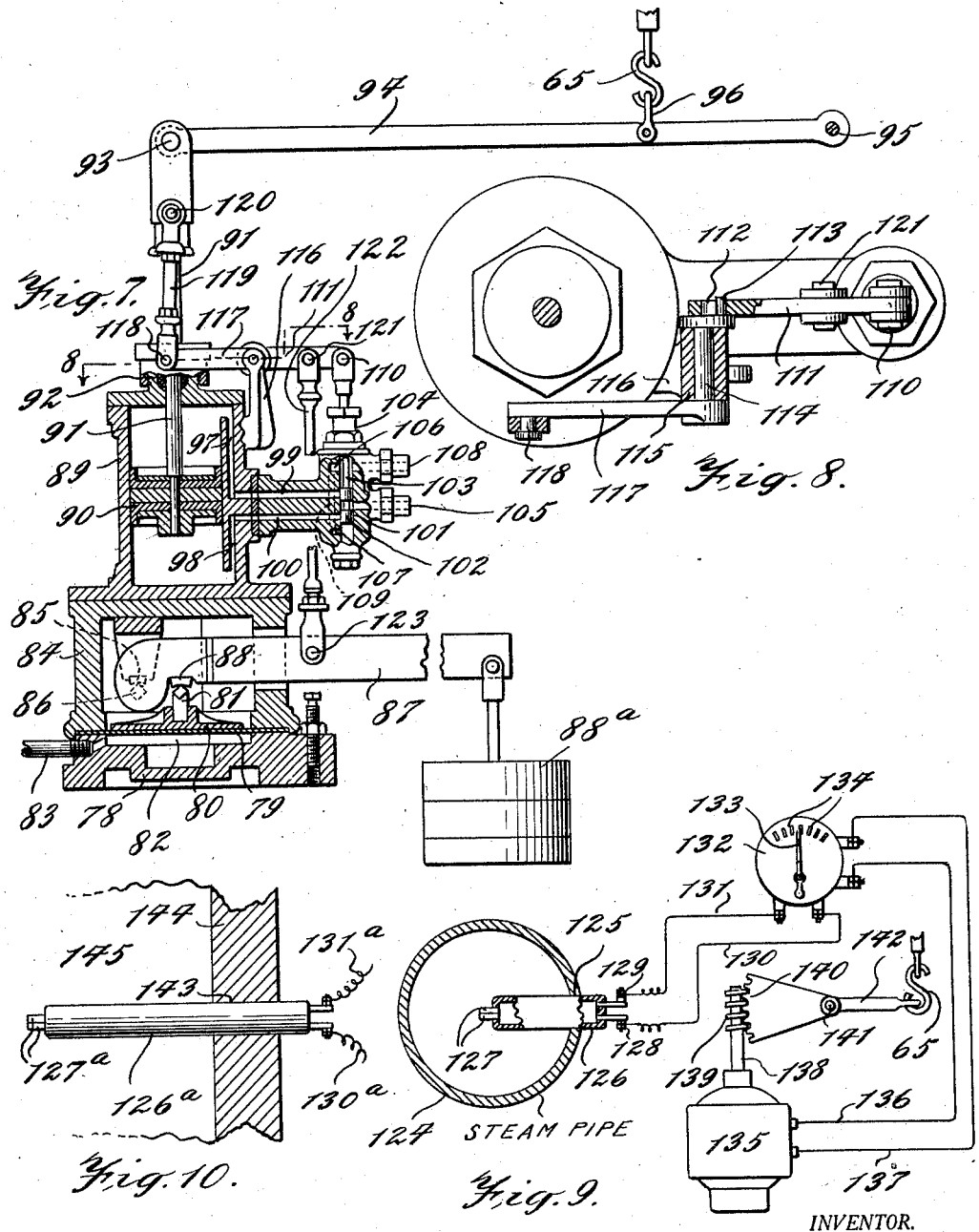
INVENTOR.
Embury McLean
BY
Gifford, Bull & Scull
ATTORNEYS Patented Apr. 15, 1930

1,754,279

UNITED STATES PATENT OFFICE

EMBURY McLEAN, OF BROOKLYN, NEW YORK, ASSIGNOR TO THE ENGINEER COMPANY, OF NEW YORK, N. Y., A CORPORATION OF NEW YORK

FURNACE AND CONTROL THEREFOR

Application filed August 4, 1923. Serial No. 655,571.

My invention more particularly relates to a new and useful apparatus for changing the rate of air supplied to the furnace in accordance with changes in the function of the furnace.

My invention will best be understood by reference to the accompanying drawings in which I have illustrated the preferred form of apparatus for carrying out my invention, and in which Figure 1 is a diagrammatic side view of a boiler and its furnace and the parts associated therewith embodying my invention; Fig. 2 is a front view of a regulator acting in accordance with the pressure of gases in the furnace and controlling the flue damper, the adjustment of which regulator is automatically changed in accordance with a function of the furnace; Fig. 3 is a sectional view through Fig. 2; Fig. 4 is a transverse section through the controlling device illustrated in Figs. 2 and 3; Fig. 5 is a plan view of the lower portion or half of the device shown in Fig. 4; Fig. 6 is a top plan view, partly in section, of the upper portion or half of the element shown in Fig. 4; Fig. 7 is a sectional view through a regulator for adjusting the position of the balanced draft regulator in accordance with the pressure of steam in the steam boiler; Fig. 8 is a sectional plan view taken along the plane of the line 8—8 of Fig. 7 looking in the direction of the arrows; Fig. 9 illustrates diagrammatically a further modification of my invention in which the balanced draft regulator is adjusted in accordance with the variations in the temperature of the steam, and Fig. 10 is a further modification showing the control means directly affected by furnace temperature.

Like reference characters indicate like parts throughout the drawings.

Referring now to the drawings and first to Figure 1, 1 is a steam boiler which is fired by a furnace 2, the grate for which is indicated at 3. The gases from the combustion space of the furnace pass across the boiler tubes 4 through the passes 5, 6 and 7 in the direction generally indicated by the arrows to the outlet flue 8, which is controlled by a damper plate 9 mounted on a shaft 10, to which is secured an arm 11 provided with a counterweight 12, the opening through the outlet flue being controlled by the position of the damper plate 9. The position of the plate 9 is controlled by a balanced draft regulator 13 which will now be described. One adaptation of this regulator for the present boiler and furnace is shown in Figures 2 and 3, wherein 14 designates a rectangular frame set in an opening in one of the walls of the furnace, and providing an opening between the furnace chamber and the external atmosphere. In this rectangular frame is arranged a swinging rectangular plate 15 fulcrumed at a point adjacent its lower end, as at 16, to the side members of the said frame, said fulcrum being located preferably at or closely adjacent the center of gravity of the plate so that said plate will remain stationary on its pivot at any point to which it may be moved. In order to insure the axis being through the center of gravity of the plate, a weight 17 is supported from said plate, said weight preferably being adjustably supported and held by upper and lower nuts 18 and 19 on threaded rods 20, secured to the lower portion of the plate 15. One side of the regulator plate 15 is exposed to the pressure of the atmosphere, while the opposite side thereof is exposed to the pressure in a chamber 21, which communicates with the furnace through a passage 22 so that the plate responds to differences in pressure between the pressure of the furnace gases and of the atmosphere. The movements of this regulator plate are employed to control the position of the flue damper 9 so as to control the rate of outflow of furnace gases through the flue. In order to accomplish this result I provide a pilot valve 23 having an inlet 24 connected by pipes 25 and 251 (Fig. 1), with a source of fluid, under pressure, and a combined inlet and outlet 26 connected by a pipe 27 to the lower end of an operating cylinder 28 containing a piston 29, connected to a piston rod 30, which is, in turn, connected by a chain or other flexible member 31 with the lever arm 11 for operating the damper 9, said flexible member preferably passing over an intermediate guide pulley 32. The pilot valve is provided with a piston valve 33 connected to a bracket arm 34, (indicated in dotted lines in Fig. 2), on the lower portion of the swinging plate 15. The pipe 25 is connected by a pipe 35 to the upper end of the cylinder 28, above described. The pipe 25 contains a hand valve 36 and the pipe 27 contains a hand valve 37. The pilot valve casing is provided with an escape opening 38 at its lower end.

The operation of said pilot valve is to control the flow of fluid under pressure to and from the lower end of the cylinder 28 in order to operate the piston 29 to control the damper 9. The weight 12 on the arm 11 tends to hold the damper in open position.

Upon a suitable bracket 39 is supported a regulator indicated generally at 40 which, in the form shown in Figs. 2 and 3, controls the operation of the swinging draft plate 15 in accordance with variations in a function of the furnace, and here illustrated as an indirect function of the furnace and specifically the rate of flow of steam from the boiler. The diaphragm chamber 40 comprises a lower half 41, the upper half of which is indicated at 42, said members being connected by headed bolts 43 and nuts thereon, and said members clamping between them a flexible diaphragm 44, which forms with the lower and upper halves 41 and 42 of the diaphragm chamber lower and upper chambers as indicated in Figure 4, the said diaphragm cutting off communication between the two chambers, except as hereinafter described. Integral with the lower member 41 is an inlet connection 45 having a port 46 leading to an opening 47 through the flange of the member 41, leading into a passage 48 in the wall of the member 42, said passage 48 communicating with the space between the diaphragm and the upper half 42 of the diaphragm chamber above the diaphragm. The connection 45 is joined to a pipe (not shown) leading to the steam boiler. Connected to the lower member 41 is an outlet connection 49 opening into the lower portion of the diaphragm chamber, said connection 49 being connected to a pipe which leads to a steam engine or other steam consuming device. The chamber between the diaphragm and the upper half of the casing opens through a port 50 into a valve casing 51 preferably formed integral with the member 42 and containing a tapered turn plug valve 52, the latter having a port 53 adapted to communicate with the said port 50 and leading to the internal bore 54 of the valve, which, in turn, communicates with a passage 55 leading into the member 41 beneath the diaphragm 44. In order to provide for a tight fit, the valve 52 is preferably tapered and fitted to a correspondingly fitted bore in the casing 51, and is urged to its seat by a spring 56 surrounding a stem 57 on said valve and at one end abutting a packing gland 58, threaded into the casing 51, and at its other end abutting the upper end of the said valve 52. The valve is provided with a head 59 adapted to be engaged by a wrench or other suitable means by which it may be rotated. Connected to the diaphragm 44, in any suitable manner, as at 60, is one end 61 of a rod 62 extending upwards through a stuffing box 63 in the upper wall of the member 42, the upper end of said rod 62 being fitted with an eye piece 64 and connected by a link 65 to one threaded member 66 of a turn bracket 67, the other threaded member 68 of which is connected to one end of a tension spring 69, the opposite end of which is connected to a bracket arm 70 rigidly fixed to the swinging plate adjacent the axis thereof. Around the rod 62 and between the stuffing box 63 and the shoulder of the eye piece 64 is placed a compression spring 71. The means for connecting the rod 62 to the diaphragm 44 consists of a dished plate 60 having a flange 72 secured by a fluid-tight joint to the lower face of the diaphragm 44 by means of screws 73 extending through said flange, and packing washers 74 between the said flange and the diaphragm and threaded into a washer or ring 75 on the upper side of the diaphragm. The dish portion of the plate 60 extends upwards through a central opening in the diaphragm and has a central opening 76 through which the rod 62 extends, the rod having beneath said plate an enlargement or head 61 of greater diameter than the opening in said plate, so that the rod and plate are connected. The underside of the plate is closed against leakage by a plate 77 held in place by the screws 73.

In operation, steam from the boiler enters the connection 45 and flows through ports 46 and 48 into the space above the diaphragm 44, thence through the port 50 and valve ports 53 and 54 and port or passage 55 into the space beneath the diaphragm 44, from which space it flows outward through the pipe connected to the outlet connection 49 and to the steam engine or other steam consuming device. The valve 52 is operable to cause a restriction to the flow between the upper and lower chambers of the regulator so as to create a reduction in pressure in the chamber beneath the diaphragm, this reduction in pressure being employed to cause movement of the diaphragm to operate the connections leading to the arm 70 on the regulator plate 15 to control the damper thereby. It will be understood that the valve 52 is set so as to result in a restriction, giving the desired difference in pressure between the fluid in the two chambers, and that any variations of this difference of pressure due to fluctuations in the temperature of the furnace and resulting indirectly in variations in the flow of steam through the diaphragm chamber (other conditions remaining stable), will operate the diaphragm and correspondingly regulate the position of the regulator plate 15, and correspondingly the damper 9 in the outlet flue, in accordance with variations in the flow of the steam through the diaphragm chamber and thus indirectly in accordance with the function of the furnace.

In Fig. 7 I have illustrated means for adjusting the position of the swinging draft plate in accordance with the pressure of the steam in the boiler. This regulator may be of any well-known and desired type which will serve the purpose and perform the functions set forth, but I prefer to employ what is known on the market as the "Mason compensating regulator", which is shown in detail in Figs. 7 and 8. As this construction is well-known, I do not deem it necessary to describe the same with particularity, but in order that the operation thereof may be understood, I briefly describe the construction and operation as follows: 78 designates a plate closed at its upper portion by a flexible diaphragm 79, upon which is seated a plate 80, upon which is mounted a fulcrum 81. The diaphragm 79 forms with the plate 78, a diaphragm chamber 82 which communicates by means of a pipe 83 with the boiler, so that the lower side of the diaphragm is subjected to boiler pressure. Supported above the diaphragm chamber is a frame 84 supporting a downwardly directed knife-edge fulcrum 85, against which bears a fulcrum pin 86 on one end of a lever 87, said lever also having a fulcrum bearing as at 88 on the said fulcrum 81, so that said lever responds to movements of the said diaphragm 79, in accordance with variations of pressure in the diaphragm chamber 82. The outer end of the lever 87 carries a weight 88$^a$ opposing the pressure exerted by the diaphragm 79 which tends to lift the lever 87. The lever 87 controls the flow of a motive fluid to a motor cylinder for changing the adjustment of the balanced draft regulating plate 15 in the same manner as does the device previously described. The motor cylinder is indicated at 89 and contains a sliding piston 90, mounted on a piston rod 91 extending through a stuffing box 92 in one end of the cylinder and connected as at 93 to one end of a lever 94, pivoted at 95, an intermediate portion of said lever being provided with an eye piece 96 to which is connected the link 65, which is the same as the corresponding link illustrated in Figs. 2 and 3 and which is connected to the regulator plate by connections which are or may be the same as those illustrated in Figs. 2 and 3. Within the cylinder 89 are inlet ducts 97 and 98, opening on opposite sides of the piston 90 and communicating through ducts 99 and 100, with a valveway 101 within which reciprocates a double-headed piston valve 102 on a stem 103 extending through a stuffing box 104 on the casing of the piston valve and operable by means of the lever 87 as will be presently described. Entering the valveway 101 is a supply opening 105, leading from a suitable source of fluid pressure, for example, water, and above and below the piston valve 102 are exhaust chambers 106 and 107 leading to an exit or exhaust 108, said piston valve 102 being operable to control the flow from the inlet 105 and to the exhaust chambers, relative to the said cylinder 89. When said piston valve is in the position shown in Fig. 7, the flow of motive fluid is cut off both to and from the cylinder 89, the heads of said valve closing the ports 99 and 100. When the piston valve moves downwardly to uncover the port 99, the flow of fluid under pressure will be permitted from the inlet 105 between the heads of the piston valve 102 to the passage 100, and thence through the passage 98 to the cylinder 89, below the piston 90 and at the same time the exhaust 108 will be connected to the upper part of the cylinder 89 through the chamber 106, and the space above the upper head of the double-headed piston valve 102. On the other hand, when the piston valve 102 moves upwardly, the upper portion of the cylinder 89 is connected to the inlet through the passage 99 and the space between the heads of the piston valve 102, and the lower portion of the cylinder 89 is connected to the exhaust through the duct 100, the chamber 107 and the duct or by-pass 109, shown in dotted lines, leading to the exhaust 108. The piston rod 103 is pivotally connected at its upper end as at 110 to one end of a lever 111, the opposite end of which is slotted as at 112 (see Fig. 8) and receives an eccentric pin 113 on a shaft 114, having its bearing as at 115 in a bracket 116 on the cylinder 89, the opposite end of said shaft 114 being rigidly connected to a lever 117 which, in turn, is pivoted as at 118 to one end of a link 119, the other end of which is pivoted as at 120 to the piston rod 91. The lever 111 is connected as at 121 to one end of a link 122, the other end of which is connected as at 123 to the lever 87. When the lever 87 is raised, as viewed in Fig. 7, about the fulcrum 86 through the link 122, the lever 111 is rotated about the pin 113, thereby raising the double-headed piston valve 102, and pressure is admitted to the upper end of the cylinder 89 as described, to move the piston 90 downwards. The downward movement of the piston 90 causes a downward movement of the link 119, which lowers the lever 117 and through the connections 112, 113 raises the adjacent end of the lever 111, which, acting on the connection 121 as a fulcrum, moves the double-headed piston valve 102 downwardly in a position to shut off the ports 99 and 100. Upon a reduction of pressure in the chamber 82 the weight 88$^a$ moves the lever 87 downwardly, thereby admitting fluid pressure to the lower portion of the cylinder 89, and causing the compensating mechanism to operate in the opposite direction from that above described. In designing this regulator, the length of leverage between the pin 113 and the shaft 114 can be so proportioned that the regulator can be caused to operate over any desired range of pressures.

In Fig. 9 I have illustrated a further modification of my invention in which the adjustment of the swinging draft plate is changed in accordance with the temperature of the steam from the boiler, which, as will be understood, is also an indirect function of the furnace. In the arrangement here illustrated, 124 is a steam pipe connected to the boiler and provided with an opening 125, through which is inserted a casing 126 carrying a thermo-couple 127 of any well-known character, to the terminals of which are connected, as at 128 and 129, conductors 130 and 131, respectively, the conductors being connected to a relay device, indicated generally at 132, and of a character well-known to those skilled in the art and which need not, therefore, be more fully illustrated or described. It will, of course, be understood that the current flowing through the conductors 130 and 131 varies with the temperature of the steam in the pipe 124 and the thermo-couple. The relay device 132 is preferably equipped with an arm 133, moving over a scale series of contacts 134. A motor 135 is connected by conductors 136 and 137 to the relay device 132. The motor shaft 138 is provided with a worm 139, which engages a segment 140 pivoted at 141, and to the shaft of which is secured an arm 142 to the outer end of which is connected a link 65, which may be the same as that described in connection with Figs. 2 and 3, and the movement of which changes the adjustment of the swinging draft plate in the same manner as does the movement of the link 65 in the arrangement shown in Figs. 2 and 3.

The relay device 132 is so adjusted that the motor 135 acting through the worm gear 139 on the segment 140 causes the segment and the arm 142 to move in unison with the arm 133 of the relay device. When the temperature of the steam increases, corresponding to an increased temperature in the furnace, the motor 135 operates the segment 140 in a direction to move the swinging draft plate in such a direction as to close, or partially close, the damper plate 9 in the outlet flue of the boiler, thereby decreasing the rate of combustion. On the other hand, when the temperature of the steam decreases, the motor 135 operates the segment 140 in the opposite direction to bring about a movement of the damper plate 9 in the outlet flue to open, or partially open, the latter, and thereby increasing the rate of combustion.

I have illustrated in Fig. 10 a further modification of my invention in which the current in the conductors 130ª and 131ª is controlled by a thermo-couple 127ª, the casing 126ª enclosing which, in this case, is inserted through an opening 143 in the furnace wall 144, the thermo-couple projecting directly into the furnace indicated at 145, so that the thermo-couple is affected directly by the furnace temperature. It will be understood that the current in the conductors 130ª and 131ª controls apparatus which is or may be the same as that illustrated in Fig. 9, increasing the rate of combustion as the temperature of the furnace decreases, and decreasing the rate of combustion as the temperature of the furnace increases.

While I have illustrated a swinging draft plate mechanism for actuating the flue damper, it will be understood that I do not confine myself to this particular mechanism, as any equivalent device, such as a gasometer, may be used.

By the expression "function of the boiler" used herein, I mean a quantity or element which varies in accordance with the operating conditions of the boiler.

I claim:

1. In a boiler furnace, suction draft means for supplying air to the furnace, a regulator subjected directly to and movable in accordance with variations in pressure in said furnace, means operable solely by said regulator for varying the effective area of the outlet flue, and means maintaining any desired status in a function of the boiler either constant or variable by automatically changing the adjustment of said regulator.

2. In combination, a boiler, a furnace having an outlet flue, a damper in said flue, suction draft means for supplying the entire amount of air to the furnace, a regulator forming the sole means for controlling said damper and actuated by draft pressure within the furnace, means acting on the regulator in opposition to the draft, and means to automatically adjust said last named means by a function of the boiler.

3. In a boiler furnace, suction draft means for supplying the entire amount of air to the furnace, a swinging plate one side of which is subjected to furnace draft pressure and operable in accordance with variations therein, means operable by said swinging plate for varying the effective area of the outlet flue, means acting on said swinging plate in opposition to the furnace draft pressure, and means for automatically adjusting said last named means in accordance with changes in a function of the boiler.

4. In a boiler furnace, suction draft means for supplying the entire amount of air to the furnace, a swinging plate one side of which is subjected to the atmosphere and the other side of which is subjected to furnace draft pressure and operable in accordance with variations in pressure therein, means operable by said swinging plate for varying the effective area of the outlet flue, means acting on said swinging plate in opposition to the furnace draft pressure, and means for automatically adjusting said last named means in accordance with changes in a function of the boiler.

5. In a boiler furnace, suction draft means for supplying the entire amount of air to the furnace, a swinging plate one side of which is subjected to furnace draft pressure and operable in accordance with variations therein, an arm attached to and movable with said plate, means operable in accordance with the movements of said arm for varying the effective area of the outlet flue, means acting on said swinging plate in opposition to the furnace draft pressure, and means for automatically adjusting said last named means in accordance with changes in a function of the boiler.

6. In a boiler furnace, suction draft means for supplying the entire amount of air to the furnace, a swinging plate one side of which is subjected to furnace draft pressure, an arm attached to and movable in accordance with the movements of said plate, means operable by said swinging plate for varying the effective area of the outlet flue, a spring acting on said plate in opposition to the draft pressure, a member operable in accordance with a function of the boiler, and means for changing the adjustment of said spring in accordance with the movements of said member.

7. In a boiler furnace, suction draft means for supplying the entire amount of air to the furnace, a swinging plate one side of which is subjected to furnace draft pressure, an arm attached to and movable with said plate, means operable by said arm for varying the effective area of the outlet flue, a member operable in accordance with variations in a function of the furnace, connections including a spring between said member and said arm, whereby the arm and the plate to which it is attached are adjusted in accordance with variations in a function of the boiler.

8. In a boiler furnace, suction draft means for supplying the entire amount of air to the furnace, a swinging plate one side of which is subjected to furnace draft pressure, an arm attached to and movable with said swinging plate, means operable by said swinging plate for varying the effective area of the outlet flue, a member operable in accordance with the steam pressure in the boiler, connections including a spring between the said member and said arm, whereby the arm and the plate to which it is attached are adjusted in accordance with variations in boiler draft pressure.

9. In a boiler furnace, suction draft means for supplying air to the furnace, a regulator comprising a swinging plate subjected directly to and movable in accordance with variations in pressure in said furnace, means operable solely by said regulator for varying the effective area of the outlet flue, and means for maintaining any desired status in a function of the boiler either constant or variable by automatically changing the adjustment of said regulator.

EMBURY McLEAN.